(12) United States Patent
Kipfer et al.

(10) Patent No.: US 10,018,836 B2
(45) Date of Patent: Jul. 10, 2018

(54) GEODETIC INSTRUMENT WITH DIFFRACTIVE OPTICAL ELEMENTS

(71) Applicant: LEICA GEOSYSTEMS AG, Heerbrugg (CH)

(72) Inventors: Peter Kipfer, Marbach (CH); Josef Lais, Marbach (CH)

(73) Assignee: LEICA GEOSYSTEMS AG, Heerburgg (CH)

( * ) Notice: Subject to any disclaimer, the term of this patent is extended or adjusted under 35 U.S.C. 154(b) by 0 days.

(21) Appl. No.: 14/710,446

(22) Filed: May 12, 2015

(65) Prior Publication Data

US 2016/0004073 A1 Jan. 7, 2016

(30) Foreign Application Priority Data

May 13, 2014 (EP) ..................................... 14168096

(51) Int. Cl.
| | |
|---|---|
| *G02B 13/06* | (2006.01) |
| *G02B 27/00* | (2006.01) |
| *G01C 1/02* | (2006.01) |
| *G01C 15/00* | (2006.01) |
| *G01S 17/02* | (2006.01) |

(Continued)

(52) U.S. Cl.
CPC ............ *G02B 27/0037* (2013.01); *G01C 1/02* (2013.01); *G01C 15/00* (2013.01); *G01S 7/4812* (2013.01); *G01S 17/023* (2013.01); *G01S 17/08* (2013.01); *G02B 5/1814* (2013.01); *G02B 13/18* (2013.01); *G02B 23/2407* (2013.01); *G02B 25/001* (2013.01)

(58) Field of Classification Search
CPC ........ G02B 23/00; G02B 23/02; G02B 23/10; G02B 23/12; G02B 23/24; G02B 23/2407; G02B 25/00; G02B 25/001; G01C 1/00; G01C 1/02; G01C 1/04; G01C 1/06; G01C 15/00

USPC ........................ 359/399–400, 419–422, 431

See application file for complete search history.

(56) References Cited

U.S. PATENT DOCUMENTS

| | | | |
|---|---|---|---|
| 6,411,372 B1 | 6/2002 | Donath et al. | |
| 6,480,332 B1 * | 11/2002 | Nakai | .................... G02B 7/008 |
| | | | 359/566 |

(Continued)

FOREIGN PATENT DOCUMENTS

| | | |
|---|---|---|
| CN | 102597694 A | 7/2012 |
| DE | 196 21 196 A1 | 11/1997 |

(Continued)

OTHER PUBLICATIONS

European Search Report dated Oct. 16, 2014 as received in Application No. 14 16 8096.

*Primary Examiner* — Robert E Tallman

(74) *Attorney, Agent, or Firm* — Maschoff Brennan

(57) ABSTRACT

The invention relates to a geodetic instrument, in particular a geodetic telescope, for example for a theodolite, or geodetic overview, photogrammetry or axial camera, comprising an imaging optical system which defines an optical axis and comprises an observation beam path for imaging a target object by an eyepiece and/or on a camera sensor, for registering and/or providing an image of the sighted target object. According to the invention, the imaging optical system comprises at least two diffractive optical elements in the observation beam path.

21 Claims, 5 Drawing Sheets

(51) Int. Cl.

| | |
|---|---|
| *G01S 17/08* | (2006.01) |
| *G01S 7/481* | (2006.01) |
| *G02B 5/18* | (2006.01) |
| *G02B 13/18* | (2006.01) |
| *G02B 23/24* | (2006.01) |
| *G02B 25/00* | (2006.01) |

(56) References Cited

U.S. PATENT DOCUMENTS

| | | |
|---|---|---|
| 6,501,541 B2 | 12/2002 | Shirai |
| 6,504,602 B1 | 1/2003 | Hinderling |
| 6,587,244 B1 | 7/2003 | Ishinabe et al. |
| 8,539,686 B2 | 9/2013 | Lais |
| 8,839,526 B2 | 9/2014 | Hinderling et al. |
| 2007/0091472 A1* | 4/2007 | Alkemper ............... G02B 3/00 359/796 |
| 2012/0014564 A1 | 1/2012 | Jensen |
| 2013/0063812 A1* | 3/2013 | Matsumoto .......... G02B 5/1895 359/399 |
| 2014/0029092 A1* | 1/2014 | Hogele ................. G02B 23/00 359/422 |
| 2014/0307252 A1* | 10/2014 | Hinderling .......... G01C 15/006 356/141.4 |

FOREIGN PATENT DOCUMENTS

| | | |
|---|---|---|
| DE | 199 41 638 C1 | 12/2000 |
| EP | 1 081 459 B1 | 6/2002 |
| WO | 2010/097346 A1 | 9/2010 |

\* cited by examiner

GEODETIC INSTRUMENT WITH DIFFRACTIVE OPTICAL ELEMENTS

FIELD OF THE INVENTION

The invention relates to a geodetic telescope, for example for a theodolite, comprising an imaging optical system which defines an optical axis and comprises an observation beam path for imaging a target object by an eyepiece and/or on a camera sensor, for registering and/or providing an image of the sighted target object.

BACKGROUND

Sighting apparatuses, in particular telescopes, are required for many applications, in particular for geodetic, constructional and military applications as well, for example for direct visual observation through an eyepiece and/or for image recording by a camera. Within the scope of geodesy, the coupling of a pure observation with a distance measurement to a sighted target object is of particular importance here, for the purposes of which, in addition to the optical system components for a telescope beam path, an integration of optical assemblies for coupling and decoupling transmission rays or distance measuring rays is required in a corresponding geodetic instrument. A required high measurement accuracy of the distance measurement, in particular, demands very stable positions and angles of the involved beam paths and assigned assemblies.

The optical setup of telescopes is, in particular, determined by the function of the telescope, for example in view of light intensity, imaging quality and focusing and magnification mechanisms. In contrast to optical measurement instruments, such as e.g. an electro-optical rangefinder with an optical receiver for receiving beams, the beams in the telescope are received e.g. by the human eye, for the purposes of which imaging with a corresponding very high quality is necessary. A challenge for engineers in the field of optics lies in the production of telescopes with a short installation length and, nevertheless, a generic high imaging quality. In order to achieve this imaging quality, it is necessary to correct optical aberrations, such as spherical and chromatic aberration, coma and distortion. These corrections are performed by means of optical components, wherein parameters such as the curvature of lenses, the number, the material with the associated optical properties and the arrangement of the corrective components, and also the highly precise manufacturing of same and the exact alignment in the telescope contribute to the image quality.

In a telescope, the demanded high imaging quality requires the generation of a diffraction-limited image in terms of the resolution thereof in the image plane of the telescope. In particular, the image circle radius in the image plane—that is the light spot of the receiving beam from a target object in the image plane caused by the aforementioned optical aberrations—as a lower limit should only be determined by the diffraction limit and only be a fraction of a micrometer. In order to be able to achieve this, corrections for limiting the (overall) aberrations to less than a quarter of the wavelength λ of the visible light, i.e. to approximately 100 nm to 200 nm, are required.

Here, the correction of the chromatic aberrations is always a challenge. It is well known that the dependence of the refractive index of a medium, thus, in particular, also of a refractively acting lens, on the wavelength causes a mutual offset of the image plane/"in-focus plane" for different wavelengths. Achromatic lenses (achromats) were developed as a conventional remedy for this phenomenon. These achromats, which are most widespread as an "achromatic doublet", are characterized as a composition of components with different dispersion, i.e. with a different refractive index for different wavelengths. Here, use is most frequently made of an ensemble of elements made of flint glass and crown glass.

Using achromats, it is possible to realize a chromatically at least approximately aberration-free image for two wavelengths. However, the images for the other wavelengths outside of the chromatically corrected range still lie in front of or behind the in-focus plane; this residual error is also referred to as "secondary spectrum". The chromatic aberration can be further reduced by using a combination of more than two lenses with different materials.

In the description, a distinction is made between "achromats" and "apochromats"; this denotes the type of correction, namely for two or three correctly focused wavelengths, but not the extent of the defocusing of the other wavelengths. The mode of action of both achromat and apochromat can therefore be improved, even outside the specific correction region, by the use of glasses with a dispersion that is as low as possible instead of regular glasses with typically relatively high dispersion. Glasses containing fluorite ($CaF_2$) have a particularly low dispersion, and so two lenses made of this material, combined with one another, can already cause a very extensive correction.

The difference in the Abbe numbers for different wavelengths is also referred to as "partial dispersion" P. In addition to the refractive index n and the Abbe number ν, the relative partial dispersion P is also important as a quality criterion for visual systems. By way of example, the relative partial dispersion $P_{g,F}$ relates to the two wavelengths g=435.8 nm and F=486.1 nm. Normal glasses are characterized by a relative partial dispersion $P_{g,F}=a_{g,F}+b_{g,F}\cdot\nu_d$, which relation describes the so-called normal line. The constants $a_{g,F}$ and $b_{g,F}$ are usually set to $a_{g,F}$=1.7241 and $b_{g,F}$=−0.008382, and $\nu_d$ denotes the Abbe number in relation to the wavelength d=587.6 nm. By way of example, these relations are depicted and described in Naumann/Schröder: "Bauelemente der Optik [Optical modules]", Chapter 3.3.2 "Optische Gläser [Optical glasses]" (Carl Hanser Verlag publishers, 6$^{th}$ edition).

The optimization of a chromatic correction can be described mathematically. To this end, for a doublet consisting of two thin lenses which are in contact with one another, the Abbe number of the materials is used for determining the correct focal length of the lenses. The following demand is raised:

$$f_1 \cdot \nu_1 + f_2 \cdot \nu_2 = 0$$

Here, $f_1$ and $f_2$ denote the focal lengths of the two lenses for the Fraunhofer D-line (λ=589.2 nm) and $\nu_1$ and $\nu_2$ are the associated Abbe numbers of the materials of the first and second lens. Since the Abbe numbers of the lenses are positive, one of the focal lengths must be negative, i.e. the associated lens must be divergent, in order to fulfill the condition.

The principle of the chromatic aberration will be illustrated and explained in more detail in conjunction with the figures of this patent application.

For imaging systems, such as telescopes, there is a demand for an in-focus image over the whole visual spectrum where possible, i.e. there is a demand for the reduction or elimination of the secondary spectrum. What is typically demanded is that the longitudinal chromatic aberration (secondary spectrum) is less than 0.2% of the focal length of an objective.

A multiplicity of optical special glasses which, however, are relatively expensive in part are known for correcting optical aberrations for visual systems. Special glasses with a relative partial dispersion which deviates—possibly strongly—from the relative partial dispersion of the normal glasses are particularly suitable for a chromatic correction (reduction in the chromatic aberration) over a broad spectral range, i.e. for reducing or lifting the secondary spectrum.

Conventional telescopes with refractive optical elements, predominantly glass lenses, often have a number of disadvantages, particularly also as a result of the aforementioned various corrections which are required for generating a high-quality image of a target object. By way of example, these relate to a large installation size of the optics, a multiplicity of discrete individual elements and a high overall weight and a difficult and complicated adjustment of the individual elements in the beam path which, together, lead to high production costs.

In order to overcome these disadvantages, various approaches were followed in recent years. These related, firstly, to a replacement of glass elements with plastic elements. This was rendered possible by the fact that the optical quality of plastic products can in the meantime largely approach the optical quality of glass products. This replacement enables a first weight reduction and also a reduction in the individual element costs, in particular if a production by forming or injection molding is possible. The system costs can be reduced, in particular, if the use of integral components for meeting a plurality of functions is possible; this also reduces the number of necessary individual adjustment steps.

Further advantages emerge, secondly, by a use of diffractive optical elements, e.g. Fresnel lenses, as a result of which the strength of the directional influence/deflection of a light ray no longer depends on the optical path length in the optically passed-through optical element, but rather depends on the type and geometric distribution of the diffractive structures of a diffractive optical element, as a result of which a further reduction in the volume and hence the mass and weight of the individual elements is achieved. Setup and function and Fresnel lens will likewise still be illustrated and explained in more detail in conjunction with the figures.

By means of diffractive optical structures for the replacement of glass lenses it is possible to replace systems made of a plurality of individual lenses by a single element. In the process, both spherical aberrations and chromatic aberrations can be corrected, with diffractive optical elements being particularly well-suited for this. In particular, the first diffractive order (first order of diffraction) of a diffractive optical element is used for chromatic correction. To this end, the Abbe number in the visible spectrum is typically between −3.5 and −3.3 (dependent on the respectively used material), and so it is negative in contrast to optical elements (e.g. made of glass or plastic) with a refractive effect. Conventional glasses have an Abbe number of between 20 and 80. As a consequence, a diffractive lens with only a very weak effect is required for the chromatic correction of a refractive lens. Corrections with higher orders of diffraction are not found to be advantageous since the diffractive structure loses its diffractive character and exhibits ever more refractive properties.

The patent document DE 199 41 638 C1 discloses a geodetic instrument with a telescope and a laser arrangement for emitting measurement radiation, in which a diffractive optical element is used in an excitation beam path for the emitted laser light. Here, the diffractive optical element is embodied as a transparent plate provided with a structure hologram, which transparent plate is arranged upstream or downstream of a deflection element in the excitation beam path and serves to diffract the collimated excitation ray in a diverging concentric manner to a circular beam.

U.S. Pat. No. 6,501,541 B2 discloses an electronic distance measurement instrument with a sighting telescope and, in particular, a diffractive optical element, embodied as a Fresnel mirror or a diffractive grating, in a reception beam path of the instrument for a wavelength-selective beam deflection of the light from the target object in the observation beam path of the telescope. Hence, the use of the diffractive optical element in this application does not result in a basic reduction of weight or a reduction in installation size/component number of the instrument since the function used here can also be fulfilled by conventional wavelength-selective and ray-deflecting elements such as e.g. prisms, as is also confirmed in the description of this document.

U.S. Pat. No. 6,587,244 B1 relates to an optical communication system for a geodetic instrument, for example a theodolite. The invention underlying this patent document serves to address the problem of enabling a satisfactory function of the instrument both for short and long distances between the target object and instrument, without to this end having to lengthen the required detection path in the instrument. The optical arrangement disclosed in this patent comprises a diffractive optical element, in particular a Fresnel lens or a diffractive grating, upstream of a photodetector in a reception beam path, but no imaging optical system assigned to this reception beam path. The disclosed diffractive optical element transmits parallel light portions of a communication light without influencing the latter, in conjunction with a converging function at the zero and at the first order of diffraction for the purposes of guiding said light components to the photodetector.

WO 2010/097346 A1 discloses a geodetic instrument with a telescope. In order to bring about an effect of in-focus imaging on the receiving surface of an employed detector of all points of a target object plane lying within a registration region of the associated optical arrangement, which effect is wanted according to the invention, the use of an imaging objective having a field curvature, in particular along the horizontal axis thereof, or the use of a diffractive structure which generates an angle of incidence-dependent variation in the focal length are proposed as alternatives to one another.

In the optical systems of the aforementioned arrangements from the prior art, diffractive optical elements are in each case used only for fulfilling a single functionality. The results achieved in the process do not appear ideal with absolute certainty, for example in relation to the optical imaging quality/chromatic correction.

SUMMARY

Some embodiments of the present invention lie in the provision of a geodetic instrument with a compact setup, in particular a geodetic telescope for allowing an observer a direct visual observation of a target object through an eyepiece.

Some embodiments enable a reduction in weight in comparison with generic conventional instruments.

Some embodiments ensure high imaging quality over a broad wavelength range, particularly in the visual part of the spectrum.

The subject matter of the invention is a geodetic instrument, in particular a geodetic telescope, for example for a theodolite, or geodetic overview, photogrammetry or axial camera, comprising an imaging optical system which defines an optical axis and comprises an observation beam path for imaging a target object by an eyepiece and/or on a camera sensor, for registering and/or providing an image of the sighted target object. According to the invention, the imaging optical system comprises at least two diffractive optical elements in the observation beam path.

By way of example, at least one of the at least two diffractive optical elements can be embodied as a hybrid lens made of a diffractive and a refractive, in particular aspherical or spherical, lens, wherein a first one of the at least two diffractive optical elements is embodied integrally in the form of an individual lens made of an optically transparent material as an objective lens and at least one lens surface has a diffractive structure, a second one of the at least two diffractive optical elements is embodied as a focusing component (focusing member) which is movable along the optical axis and which comprises at least one diffractive optical element, and the observation beam path is defined between the objective lens and the focusing member.

Using this, a substantially more compact embodiment of the observation beam path compared to a telescope with a conventional optical system is made possible, connected with a significant reduction in weight. The objective lens, which conventionally typically consists of three individual lenses, is advantageously replaced by an integrally embodied optical component. As a result of the focusing component (focusing member) being arranged in a movable manner along the optical axis, it is possible to focus an image of the target object in a user and/or application dependent manner and in focus for the purposes of the visual observation by the eye of the user or for the purposes of imaging on a camera sensor.

The diffractive optical elements can consist of glass, plastics or a combination of glass and artificial. In particular, i.e. alternatively or additionally, they can be produced by replication technology. A production by means of replication technology typically has a cost-reducing effect.

In particular, the objective lens can comprise a material made of crown glass. Alternatively or additionally, the objective lens can comprise a material with an additional layer material applied by replication technology. Here, it is advantageous, particularly in view of the forming fidelity, if the thickness of the applied layer material is less than 50 µm. In the case of optical elements with a planar embodiment and a layer material applied by replication technology, the layer thickness can—without significant disadvantages in respect of the forming fidelity—also be up to approximately 0.15 mm.

In accordance with one embodiment, the movable focusing component can comprise flint glass and elements produced by replication technology. In particular, the movable focusing member can comprise a spherical plastic lens and a diffractive plastic lens.

In accordance with a further embodiment, the objective lens and the focusing component both respectively comprise a combination of crown glass and flint glass as material.

Specifically, the objective lens is embodied as a hybrid (i.e. made of a refractive, in particular aspherical or spherical, lens with a diffractive structure).

In accordance with a further embodiment, diffractive and aspherical structures are produced by embossing or injection molding, in particular wherein the asphericities have small dimensions.

In accordance with a further embodiment, the objective lens and the focusing component are both respectively embodied as hybrids.

By way of example, the objective lens and the focusing component can both be respectively embodied integrally as individual elements. The objective lens, which conventionally typically consists of three individual lenses, is replaced by an integrally embodied optical component and the focusing component conventionally replaces two optical elements used for this function.

In particular, the diffractive optical elements are embodied for chromatic corrections by means of the first order of diffraction thereof and, simultaneously, for suppressing the zero and/or higher orders of diffraction. In particular, this can be implemented by way of generating large circles of confusion in the case of diffraction for these orders of diffraction. What can furthermore be implemented here is that imaging of the remaining intensity of higher orders of diffraction is implemented with a component of less than 5% of an overall imaging intensity.

In accordance with one embodiment, a superposed asphere is used for correcting spherical aberrations. As a result of this, spherical aberrations, which are not affected by a correction of chromatic aberrations, can be eliminated or at least reduced.

In accordance with a further embodiment, the aperture of at least one of the employed lenses has different zones with different properties. In particular, these can be different zones with different focal lengths. By way of example, this is advantageous as an embodiment for near-field optics for an electronic rangefinder.

In accordance with a further embodiment, the diffractive optical elements are embodied to fulfill different functionalities. These can be spectral or non-spectral beam splitting, possibly in addition to other functions to be fulfilled by these diffractive elements.

In accordance with a further embodiment, the diffractive optical elements are embodied for imaging on various optical sensors, in particular by means of an extended focal range.

BRIEF DESCRIPTION OF THE DRAWINGS

The invention is described in an exemplary manner in the following figures. Here, the same reference signs denote equivalent structure elements. In detail.

DETAILED DESCRIPTION

Figure 1:
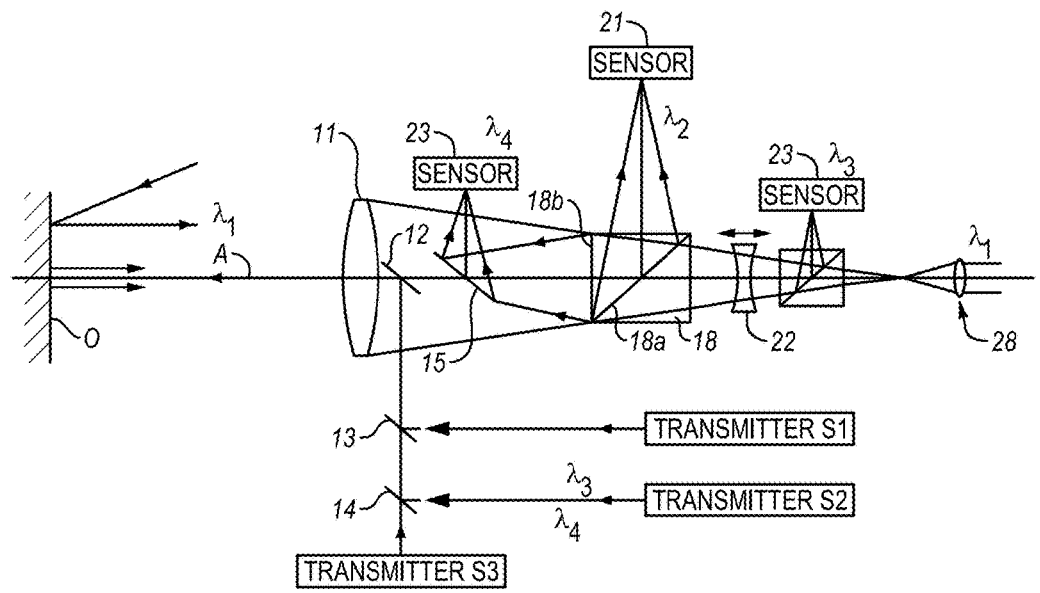
FIG. 1 schematically shows the setup of a tachymeter telescope according to the prior art.

FIG. 1 schematically shows the setup of a tachymeter telescope according to the prior art, wherein the telescope objective is only indicated by a front lens 11. The setup substantially corresponds to an arrangement disclosed in EP 1 081 459 B1. All essential optical components in this system are aligned on a common optical axis A. An emergence mirror or an emergence prism 12, by means of which the respective beam of one of three transmitters/emitters S1, S2 and S3 is directed in the direction of the optical axis A, is arranged on this optical axis A. The central mirror arrangement 12 ensures that the respective transmitter-side beams generate a coaxial effect.

The three transmitters/emitters S1, S2 and S3 can be any type of radiation source, in particular light source, and emit a different and/or spectrally separable wavelength range. By way of example, the transmitter S1 emits at a wavelength or wavelength range $\lambda_2$, the transmitter S2 emits at a wavelength or wavelength range $\lambda_3$ and the transmitter S3 emits at a wavelength or wavelength range $\lambda_4$. By way of example, at least one of these wavelength ranges differs from the surrounding light visible to the eye, which is referred to as $\lambda_1$ below and which has a wavelength of between approximately 400 nm and 700 nm. The radiation from each one of these three transmitters S1, S2 and S3 propagates in the manner visible from FIG. 1, wherein the rays of the transmitters S1 and S2 are, for example, redirected in the direction toward the mirror 12 by means of partly transmissive mirror surfaces 13 and 14.

By way of example, $\lambda_2$ can be provided as a wavelength for automatic target registration and lie in the infrared or in the visible range. In accordance with this example, $\lambda_4$ lies in an infrared range deviating from $\lambda_2$ and $\lambda_3$ lies in the visible range of the light but is a low-diffraction beam. It would also be possible to provide merely a single transmitter with a corresponding spectrally broadband emission spectrum and use said transmitter in combination with appropriate filters and objectives for alternating emission of radiation in different wavelength ranges and with different divergences.

By means of the mirror 12, the respective emission ray is directed coaxially along the axis A onto a surface O of a target object, from where this radiation is radiated back or scattered back to the objective 11, either by way of a mirror or reflector, such as a retroprism, a reflection film, a retroreflector, target plate with identification features, attached to the surface O or in a diffuse manner. This means that the rays reflected from the surface O of the target object reenter the objective 11 coaxially along the axis A.

Beam paths for three sensor apparatuses in accordance with this example are provided downstream of the mirror 12 in the observation beam path, i.e. in the beam path of the light radiated back from the object. Here, this can be, inter alia, a position-sensitive two-dimensional sensor 21, such as a PSD chip, CCD chip, CMOS chip, or any other photo ASIC. A focusing unit, which is merely indicated by lens 22 and which serves to generate an in-focus image of the target object in conjunction with an eyepiece 28 for visual observation or to project said image onto the sensor area of the camera sensor, is arranged in the further course of the observation beam path.

In the case of a distance/measurement combination 23, this should serve two purposes, namely, firstly, for the distance measurement by way of at least one reflector or at least one target marker to a target object to be measured and, secondly, to a natural target object without such a target characterization. To this end and to the extent that it is not intended to use separate sensor apparatuses for each type of measurement, the distance/measurement combination 23 must be configured to be sensitive only to the wavelength ranges $\lambda_3$ and $\lambda_4$ of the transmitters S2 and S3, which latter transmitters are assigned to the two aforementioned types of distance measurement. By way of example, this can be brought about by using a suitable spectral filter. Alternatively, the surfaces mirroring away from the axis A to the units 23 can have the corresponding wavelength-selective embodiment.

The focusing member 22 is arranged in the beam path of the eyepiece 28, with irradiation in the visible wavelength range $\square_1$, i.e. light of the surroundings incident on the target object. If an in-focus image is intended to be generated not only in the visual telescope channel 11, 18, 22, 28 but also on the image sensor 21, it is advantageous to embody the telescope system 11 in a manner known per se with a focusing option. This is because the beam path leading to the two-dimensional sensor 21 leads away from the optical axis A by means of a beam splitter prism 18 which deflects light toward the sensor 21 by means of the partly mirrored surface 18a thereof. However, this prism 18 also has a front partly mirrored surface 18b, which deflects the incident light to the mirror 15 which in turn guides said light onto the distance/measurement combination 23. Preferably, the mirror surfaces 18a and 18b are embodied as high-quality thin-layer films for the purposes of an efficient spectral separation of the incident light rays with different wavelengths.

Figure 2A:
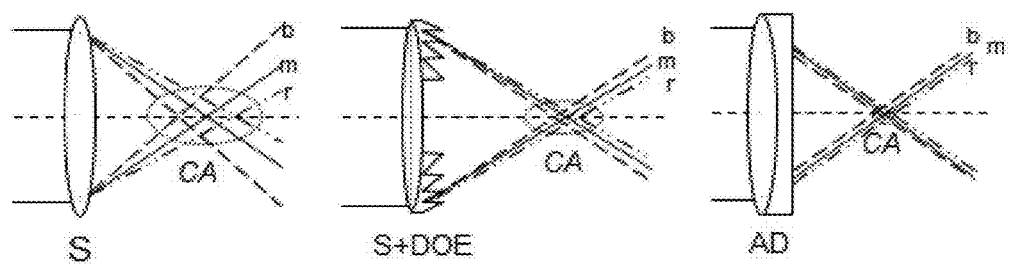
FIG. 2a shows the principle of the chromatic aberration of a lens and associated correction options.

FIG. 2a illustrates the principle of the chromatic aberration of a lens and associated correction options. Here, the left-hand partial image elucidates the various focal lengths for different light wavelengths (shorter wavelengths for blue light, b, medium length wavelengths m for green or yellow light and longer wavelengths for red light, r). In the case of the chromatically uncorrected lens S, there is a clear chromatic aberration CA, i.e. a shift in the focus between the different light wavelengths. The central partial image illustrates that the use of a diffractive optical element with dispersion properties complementary to the glass, S+DOE, is suitable for correcting the chromatic aberration of the lens. As a result, the chromatic aberration CA of the imaging system is significantly reduced. The right-hand partial image illustrates that an achromatic doublet AD with a combination of individual elements, e.g. made of crown glass and flint glass, is likewise suitable in the range of the visible spectrum.

Figure 2B:
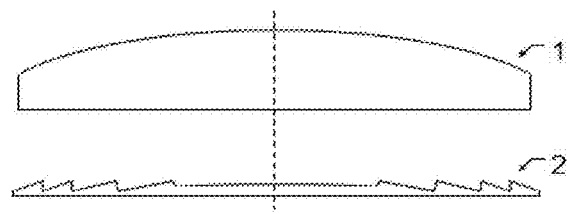
FIG. 2b shows the setup and function of Fresnel lenses.

The design and function of Fresnel lenses are illustrated on the basis of FIG. 2b. Here, a lens with a regular embodiment (1, above) and a Fresnel lens (2, below) with the same focal length are illustrated. A Fresnel lens, or more precisely a "Fresnel stepped lens", is an optical lens which was invented around 1822 by the French physicist Augustin Jean Fresnel. As a result of the applied construction principle, the weight and volume of large lenses is generally reduced; this has an effect especially in the case of lenses with a short focal length which, in the normal form, are very thick and comparatively heavy. The reduction in the volume in the Fresnel lens is brought about by a subdivision into ring-shaped regions. The thickness is reduced in each one of these regions, and so the lens obtains a series of ring-shaped steps. Since light is only refracted when passing through the lens surfaces, the refractive angle is not dependent on the lens thickness, i.e. the passed-through lens volume, but only on the angle between the two surfaces. The lens keeps its focal length with, compared to a regular lens, a significantly reduced thickness and reduced weight; however, the imaging quality is typically reduced as a result of the step structure.

Figure 3A:
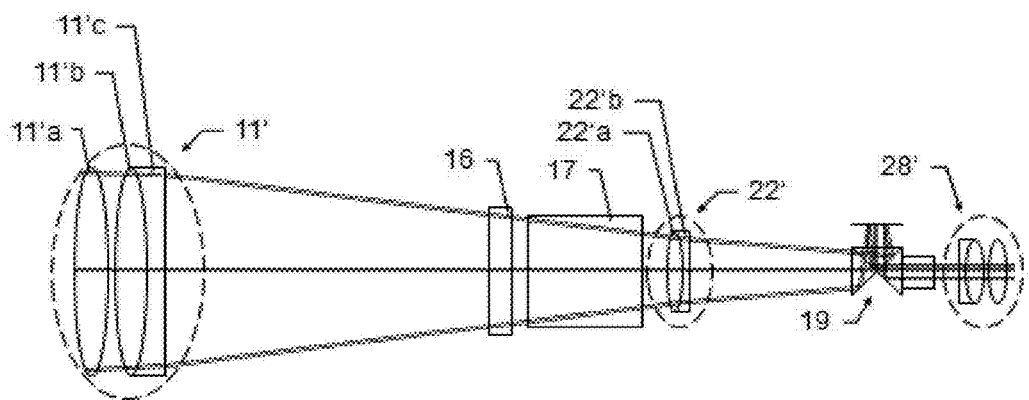
FIG. 3a shows in more detail the observation beam path of a typical embodiment of the conventional telescope in accordance with FIG. 1.

FIG. 3a shows in more detail the observation beam path of a typical embodiment of the conventional telescope in accordance with FIG. 1. Here, the lens combination 11' corresponds to the objective lens and the focusing member 22', likewise embodied as a lens combination, corresponds to the focusing lens. The reference signs 16 and 17 denote spectral filters or deflection or decoupling elements which are arranged in the beam path when necessary. Likewise, a lens combination 28' is depicted here in place of the eyepiece 28, with a further optical deflection element or deflection prism 19 for example being arranged upstream of said lens combination in the beam path. What follows from this detailed consideration is that the optical observation system of a conventional telescope has a multiplicity of discrete optical elements, requiring a relatively high weight, high spatial requirements for the arrangement, careful mutual matching in terms of the selection of the individual optical elements to be used and careful adjustment thereof in the beam path.

Figure 3B:
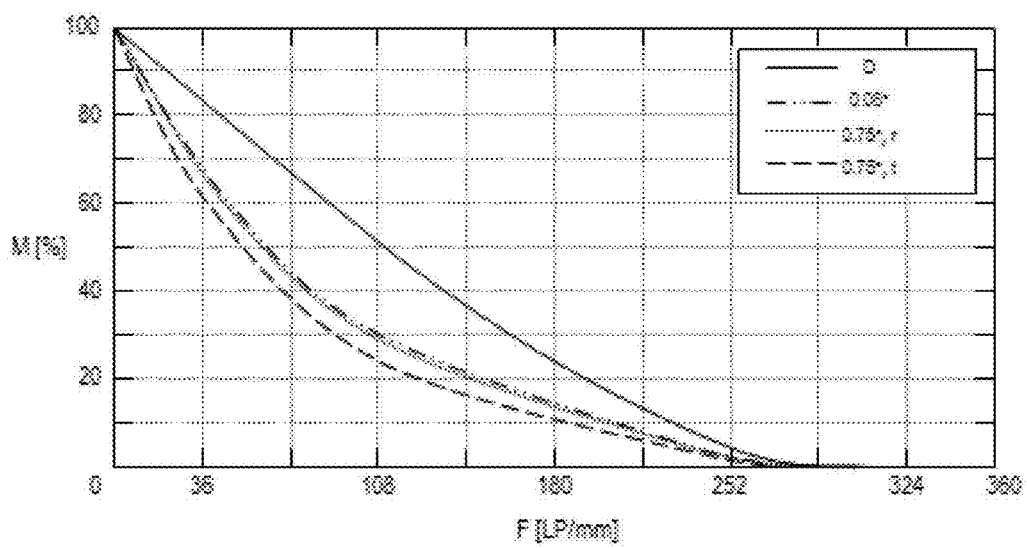
FIG. 3b shows, as a quality criterion for the optical system of the observation beam path depicted in FIG. 3a, the modulation emerging at the output of the observation beam path as a function of the spatial frequency.

FIG. 3b shows the modulation, more precisely modulation transfer, M (in percent %) as a function of the spatial frequency F ("spatial frequency"), measured in cycles per millimeter ("cycles/mm") or line pairs per millimeter (LP/mm), emerging at the output of the observation beam path, i.e. at the eyepiece 28', as a criterion for the imaging quality of the optical system of the observation beam path depicted in FIG. 3a. The last parameter constitutes a measure for the image resolution, i.e. for the distinguishable line spacing. Logically, a modulation transfer or contrast transmission of almost 100% therefore emerges for the lowest spatial frequencies and this contrast transmission value drops ever more in the direction of higher spatial frequencies. Here, the upper curve in this diagram depicts the theoretical ideal profile caused by the diffraction limit. It is clear that the curves for the two depicted aperture angles of 0.08° and 0.75° (corresponding to an almost closed and a more open stop in a camera) deviate significantly from this ideal curve, with the curves for larger aperture angles deviating more strongly from the ideal profile. In the conventional MTF ("modulation transfer function") illustrations, two values are specified for a stop or an aperture angle, namely a sagittal or radial value and a tangential value. Here, the terms "sagittal/radial" and "tangential" relate to an image circle and a point where the radial value r is typically greater than the tangential value t. However, the two values are not yet distinguishable in this illustration for the aperture angle of 0.08°. By contrast, the tangential values for the 0.75° curve lie significantly lower than the curve for the radial values and also deviate significantly from the curve for 0.08° for even lower spatial frequencies.

Figure 4A:
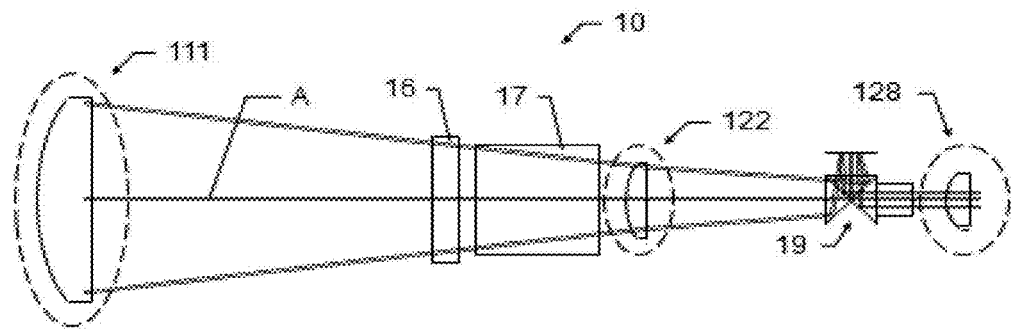
FIG. 4a shows an optical system for the beam path of a geodetic telescope according to the invention.

FIG. 4a shows an imaging optical system 1 with a beam path A for a geodetic telescope according to the invention, comprising an objective lens 111, a focusing member 122 and an eyepiece 128. The remaining optical elements in the beam path of the imaging optical system 1 according to the invention correspond to those from FIG. 3a. In particular, the imaging optical system 1 and the various components thereof are matched for generating an in-focus image of a sighted target object in the visual to near infrared part of the spectrum, in particular in the wavelength range between 350 nm and 800 nm. Details of the imaging optical system 1 according to the invention are depicted in FIGS. 4b and 4c.

Figure 4B:
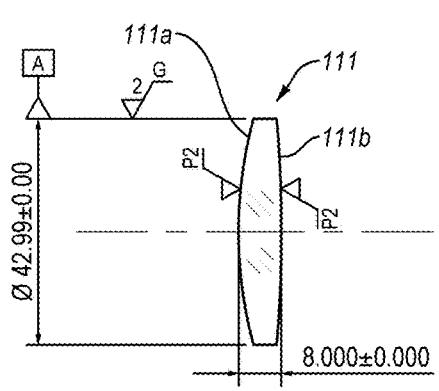
FIG. 4b shows important parameters for constructing the objective lens 111 of the optical system according to the invention.
Figure 4C:
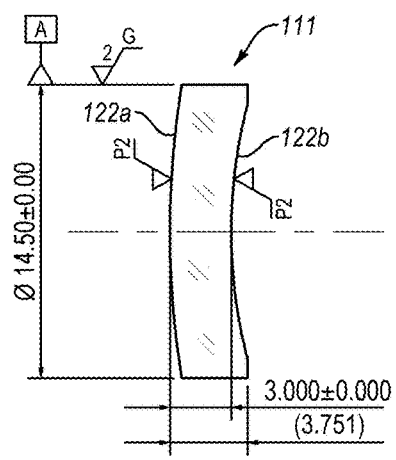
FIG. 4c shows important parameters for constructing the focusing member of the optical system according to the invention.

FIG. 4b illustrates possible parameters for the construction of the objective lens 111 of the optical system according to the invention in an exemplary manner, which objective lens is embodied as a hybrid made of an aspherical lens on the front side 111a (coming from the target object in the observation beam path) and a diffractive optical element on the rear side 111b. By way of example, the objective lens can act as a glass substrate (spherical front side) with a diffractive structure which is adhesively bonded to the rear side and embodied as a plastic replica. The objective lens 111 replaces a lens triplet 11' in accordance with the conventional arrangement according to FIG. 3a.

The most important parameters of a possible embodiment for the objective lens 111 are as follows:
Focal length: 125.8 mm
Diameter: 43 mm
Free aperture: 40.03 mm
Thickness: 8 mm
Glass: crown glass
Working wavelength: 450 nm-635 nm
Design working wavelength of the diffractive structure: 555 nm
Front side: spherical (convex)
Rear side: diffractive aspherical
The phase function of the diffractive structure uses quadratic ($r^2$) and quartic (i.e. biquadratic, $r^4$) radial terms for correcting (in particular completely correcting) the chromatic aberration:

$$\varphi(r) = C_1 \frac{2\pi \cdot m}{\lambda_C} r^2 + C_2 \frac{2\pi \cdot m}{\lambda_C} r^4$$

where $C_i$: coefficients of the diffractive structure.
The phase must be decomposed modulo 2 $\pi m$ in order to obtain the diffractive element.
Here, the order of diffraction is m=1.
The smallest period is monitored in the design phase; it is calculated from the maximum gradient:

$$\frac{d\varphi}{dr}\text{max}(@20 \text{ mm}) \Rightarrow \text{smallest period} > 20 \text{ μm}$$

The maximum of the gradient is usually situated on the lens edge, in this case at e.g. 20 mm.
The finest period should be greater than 20 πm.
Then, with $\lambda_C$=555 nm, the surface profile z is calculated as:

$$z(r) = \frac{\varphi(r) \cdot \lambda_C}{2\pi(n-1)}$$

FIG. 4c illustrates, in an exemplary manner, possible parameters for constructing the focusing member 122 of the optical system according to the invention, which is embodied as a doublet made of a diffractive optical element on the front side 122a and an aspherical lens on the rear side 122b.

The most important parameters of one possible embodiment for the focusing member 122 are as follows:
Focal length: −73.3 mm (−83.6 mm without DOE)
Diameter: 18 mm
Free aperture: 15 mm
Thickness: 3 mm
Glass: flint glass
Front side: diffractive spherical
Rear side: spherical
Working wavelength: 450 nm-635 nm
Design working wavelength of the diffractive structure: 555 nm
The diffractive structure is arranged on the front side of the focusing member.
The phase function of the Fresnel lens is as follows:

$$\varphi(r) = C_1 \frac{2\pi \cdot m}{\lambda_C} r^2 + C_2 \frac{2\pi \cdot m}{\lambda_C} r^4$$

Then, with $\lambda_C$=555 nm, the surface profile z is calculated as:

$$z(r) = \frac{\varphi(r) \cdot \lambda_C}{2\pi(n-1)}$$

Figure 4D:
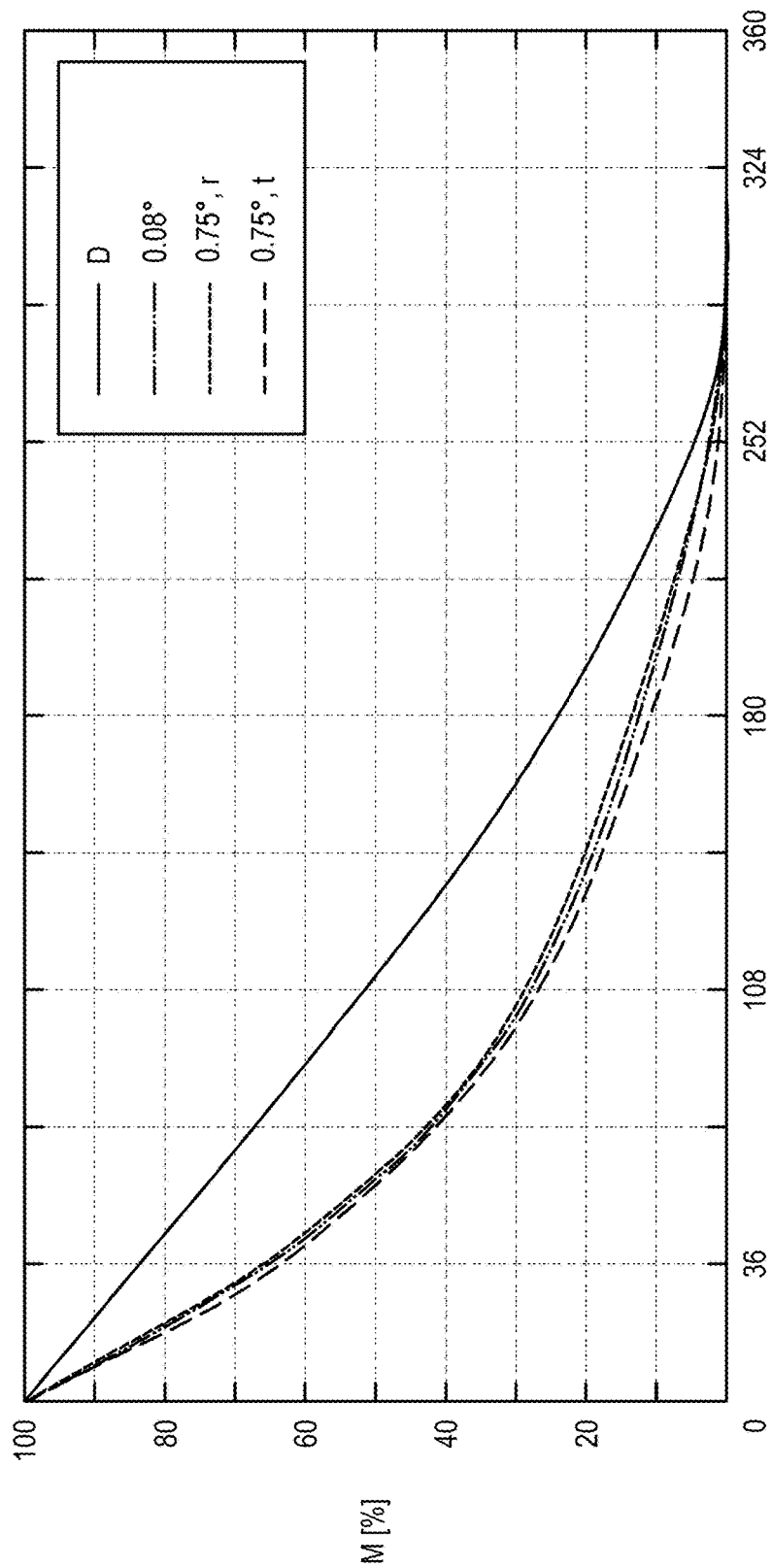
FIG. 4d shows, as a quality criterion for the optical system of the observation beam path depicted in FIG. 4a, the modulation emerging at the output of the observation beam path as a function of the spatial frequency.

FIG. 4d shows, in a manner directly comparable to the illustration of FIG. 3b, the modulation M as a function of the spatial frequency F emerging at the output of the observation beam path, i.e. at the eyepiece 128, as a criterion for the imaging quality of the optical system according to the invention of the observation beam path depicted in FIG. 4a. Compared to FIG. 3b, it is conspicuous that all curves for this system have a less pronounced distance from the theoretical ideal profile and, in particular, the curves have significantly fewer deviations among themselves. The curve of the tangential values for the aperture angle 0.75° only lies clearly lower than the curve of the radial values for this angle and the curve for the aperture angle 0.08° from a spatial frequency of approximately 160 line pairs per millimeter onward, with the latter two curves hardly deviating from one another in an identifiable manner. This verifies that a significantly better imaging quality is achieved with the optical arrangement according to the invention than with the conventional system.

It is understood that these depicted figures only schematically illustrate possible exemplary embodiments. The various approaches can likewise be combined with one another and with methods and geodetic telescopes from the prior art.

What is claimed is:

1. A theodolite or total station comprising:
a laser transmitter configured to transmit a laser measurement beam towards a target object,
a distance measuring sensor, and
a geodetic telescope, comprising:
an imaging optical system which comprises an objective assembly which is determined by the function of the telescope, wherein the imaging optical system defines an optical axis and comprises an observation beam path for imaging the target object on an intermediate image plane observable by an eyepiece and/or on a camera sensor for providing and/or registering an image of the sighted target object, wherein:
the imaging optical system comprises an emergence mirror or an emergence prism, the emergence mirror or the emergence prism being arranged on the optical axis in the observation beam path and being configured to direct the laser measurement beam coaxially along the optical axis towards the target object,
the imaging optical system comprises a beam splitter arranged downstream of the emergence mirror or the emergence prism in the observation beam path, namely in the beam path of the light radiated back from the target object, the beam splitter being adapted to deflect at least part of the laser measurement beam radiated back from the object away from the optical axis towards the distance measuring sensor,
the imaging optical system has at least two diffractive optical elements in the observation beam path, and
the objective assembly comprises a first one of the at least two diffractive optical elements as a diffractive objective component.

2. The theodolite or total station according to claim 1, wherein:
at least one of the at least two diffractive optical elements is embodied as a hybrid lens made of a refractive lens with a diffractive structure.

3. The theodolite or total station according to claim 1, wherein:
at least one of the at least two diffractive optical elements is embodied as a hybrid lens made of a aspherical lens or spherical lens with a diffractive structure.

4. The theodolite or total station according to claim 1, wherein:
the at least two diffractive optical elements is formed from glass, plastic or combinations of glass and plastic and/or are produced by replication technology.

5. The theodolite or total station according to claim 1, wherein:
the objective component comprises an objective lens embodied as a hybrid lens.

6. The theodolite or total station according to claim 1, wherein:
the diffractive objective component comprises a material made of crown glass and/or a diffractive structure that comprises a layer material with a layer thickness of less than 0.15 mm applied by replication technology.

7. The theodolite or total station according to claim 1, wherein:
the diffractive objective component comprises a material made of crown glass and/or a diffractive structure that comprises a layer material with a layer thickness of less than 0.05 mm applied by replication technology.

8. The theodolite or total station according to claim 1, wherein:
the objective assembly overall includes only one optical element which is provided by one of the at least two diffractive optical elements.

9. The theodolite or total station according to claim 1, wherein:
the observation beam path has an eyepiece and the optical system is embodied for imaging the sighted target object on an intermediate image plane observable through the eyepiece for providing an image of the sighted target object, and
the eyepiece has one of the at least two diffractive optical elements of the imaging optical system.

10. The theodolite or total station according to claim 1, wherein:
at least one of the at least two diffractive optical elements has diffractive and aspherical structures, which are produced by embossing or injection molding, wherein the asphericities have small dimensions.

11. The theodolite or total station according to claim 1, wherein:
the at least two diffractive optical elements are embodied for chromatic corrections by means of the first order of diffraction thereof and, simultaneously, for suppressing the zero and/or higher orders of diffraction.

12. The theodolite or total station according to claim 1, wherein:
the at least two diffractive optical elements are embodied for chromatic corrections by means of the first order of diffraction thereof and, simultaneously, for suppressing the zero and/or higher orders of diffraction by means of generating large circles of confusion in the case of diffraction for these orders of diffraction.

13. The theodolite or total station according to claim 1, wherein:
the at least two diffractive optical elements are embodied for chromatic corrections by means of the first order of diffraction thereof and, simultaneously, for suppressing the zero and/or higher orders of diffraction for imaging remaining intensity of higher orders of diffraction with a component of less than 5% of an overall imaging intensity.

14. The theodolite or total station according to claim 1, wherein:
a superposed asphere is used in at least one of the at least two diffractive optical elements for correcting spherical aberrations.

15. The theodolite or total station according to claim 1, wherein:
at least one lens aperture has different zones with different properties in at least one of the at least two diffractive optical elements, wherein different zones have different focal lengths, specifically for near-field optics for an electronic rangefinder.

16. The theodolite or total station according to claim 1, wherein:
the at least two diffractive optical elements are embodied for fulfilling different functionalities.

17. The theodolite or total station according to claim 1, wherein:
the at least two diffractive optical elements are embodied for imaging on different optical sensors by means of an extended focal range.

18. The theodolite or total station according to claim 1, wherein:
the telescope comprises a focusing member, wherein:
the focusing member contains a second one of the at least two diffractive optical elements as diffractive focusing component, wherein this is movably arranged along the optical axis.

19. The theodolite or total station according to claim 18, wherein:
the focusing member comprises flint glass and elements produced by replication technology or a diffractive plastic lens and a spherical flint glass lens.

20. The theodolite or total station according to claim 18, wherein:
the focusing member overall includes at most two optical elements of which one is provided by one of the at least two diffractive optical elements, wherein the focusing member overall includes only one optical element which is provided by one of the at least two diffractive optical elements.

21. The theodolite or total station according to claim 18, wherein:
at least three diffractive optical elements are present,
the objective assembly comprises a first one of the at least three diffractive optical elements,
the focusing member contains a second one of the at least three diffractive optical elements, and
the eyepiece comprises a third one of the at least three diffractive optical elements.

* * * * *